July 28, 1970  H. R. GEISTER  3,521,773
TRAILER WITH PORTABLE CONTAINERS
Filed July 15, 1968  3 Sheets-Sheet 1
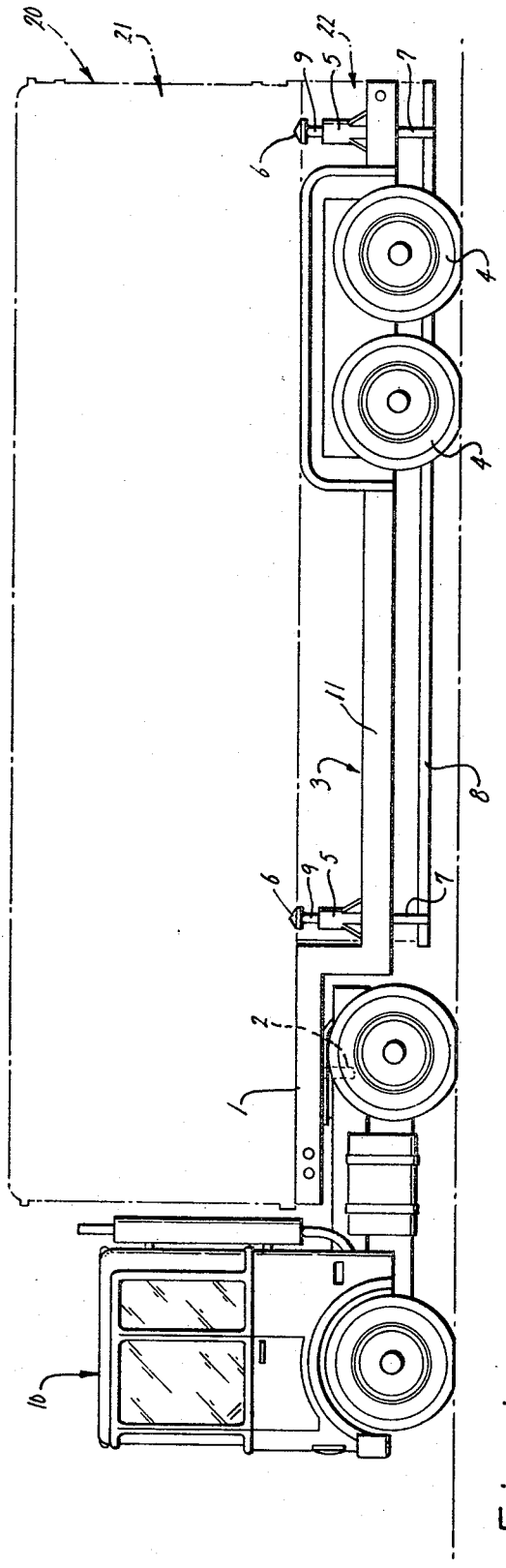
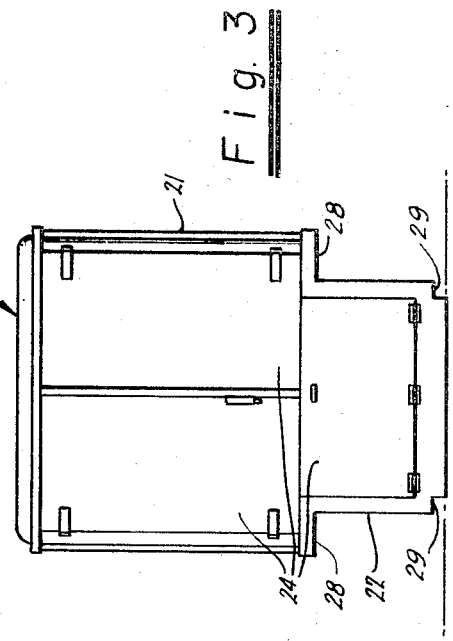
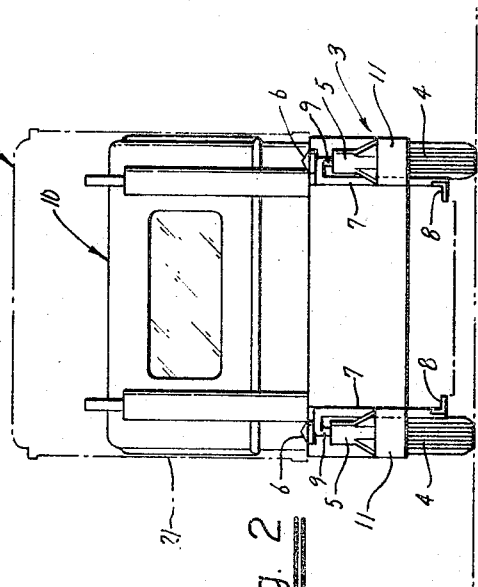
INVENTOR.
Harold R. Geister
BY
Attorney

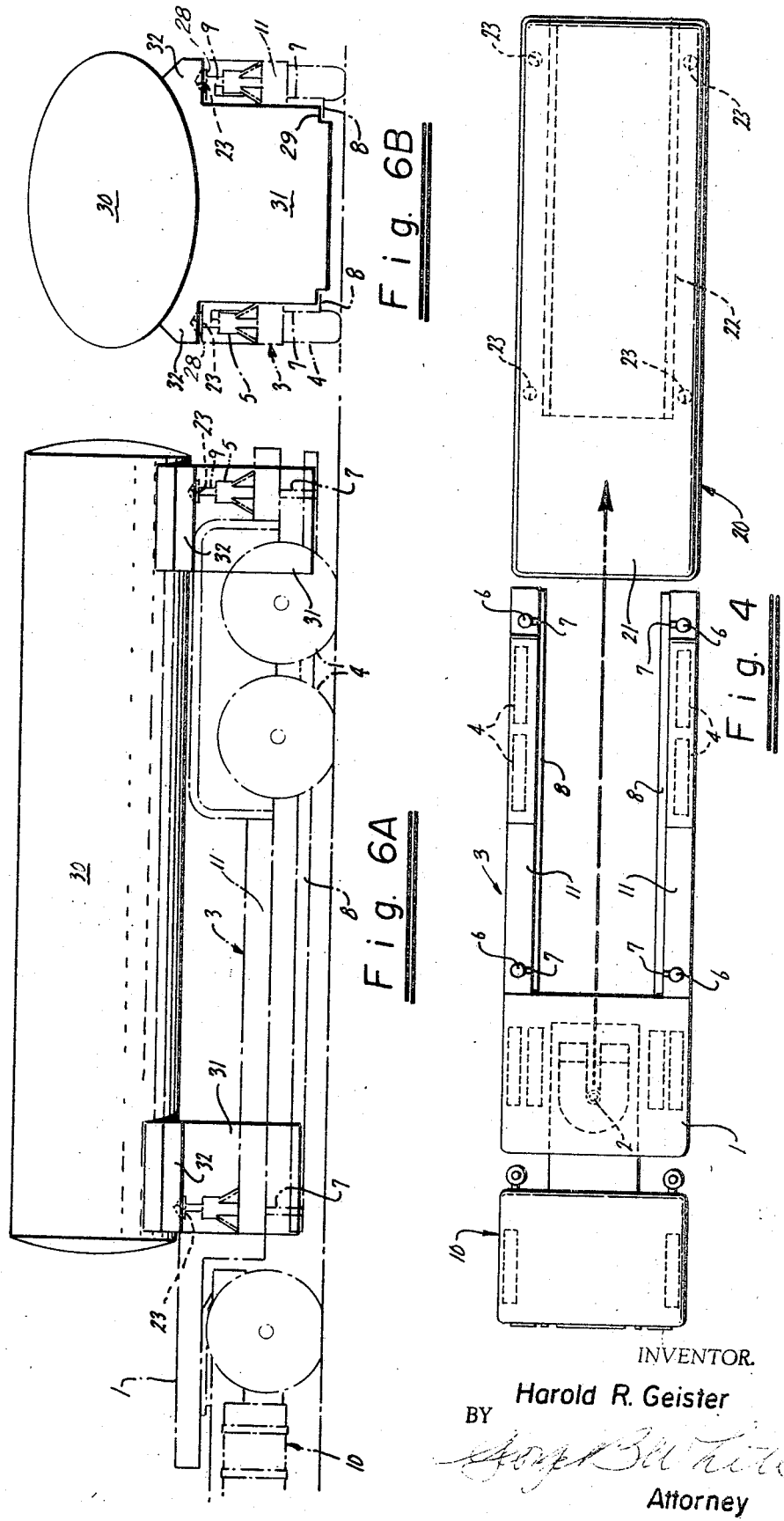

July 28, 1970  H. R. GEISTER  3,521,773
TRAILER WITH PORTABLE CONTAINERS
Filed July 15, 1968  3 Sheets-Sheet 3

INVENTOR.
Harold R. Geister
BY
Attorney

United States Patent Office 3,521,773
Patented July 28, 1970

3,521,773
TRAILER WITH PORTABLE CONTAINERS
Harold R. Geister, 5 Pigeon Hollow Road,
San Rafael, Calif. 94901
Filed July 15, 1968, Ser. No. 744,823
Int. Cl. B60p *1/64*
U.S. Cl. 214—390
4 Claims

ABSTRACT OF THE DISCLOSURE

A combination of a truck trailer with a container for cargo provides for picking up and dropping off of the container from the trailer as well as for holding the container in position during transportation. The combination also provides for advantageous loading and unloading and eliminates the need for multiplicity of trailers.

BACKGROUND OF THE INVENTION

The use of trucks or tractors and trailers in the trucking industry has been practiced for many years. One of the disadvantages is the necessity for providing, maintaining, paying licenses and insurance for a large number of trailers.

Attempts have been made to overcome this problem by providing portable or removable containers for cargo or loads which may be placed upon or removed from a single trailer and left in position for loading or unloading while the truck or trailer engages in other work.

All of these are attended by many disadvantages. Among these are the necessity for heavy and expensive lifting equipment, the need for special means of support for the container during the loading and unloading and the consequent necessity for extra labor which is involved in the use of the existing types.

Existing devices are likewise limited in their capacity and are lacking in flexibility insofar as type of cargo which may be handled.

It is therefore a general object of my invention to provide a trailer and container combination which would provide for greater flexibility and ease of operation than those now in use.

It is another object of my invention to provide a container for a trailer which would have a greater capacity than those now in use.

It is a more specific object of my invention to provide a device in combination with a trailer which would enable easy loading of the container upon a trailer, holding it in position while in transporting and removing it for unloading at the destination.

It is finally an object of my invention to provide a cargo container for use with a trailer which would permit extreme ease of loading and unloading after the container is removed from the trailer.

SUMMARY

My invention comprises essentially the use of a container having a generally T-shaped cross-section. This permits the use of my novel hydraulic device for raising the container from the ground up upon the trailer. For this purpose I use a series of hydraulic cylinders or jacks mounted on a trailer frame or body. These are equipped with the usual hydraulic plungers but employ a novel combination of an adapter which works upon the wide ends of the T and at the same time raises the narrow or straight portion of the T. In this manner I am able to use a container having a larger cross-sectional area and hence volume. This device and combination also insures stability of the container while in transit. Probably one of the biggest advantages is that the container itself needs no auxiliary legs or other devices to perform the operation of loading and unloading from the trailer as is true of present devices.

My invention is also quite flexible in that it is adapted to liquid, bulk, and other types of cargo carriers without any basic changes in construction.

DESCRIPTION OF DRAWINGS

FIG. 1 is a side elevation of the tractor in combination with the trailer of my invention.

FIG. 2 is an end view showing partly the hydraulic cylinders and shoe combinations of my invention.

FIG. 3 is a cross-section through the container of my invention.

FIG. 4 is a diagrammatic top view of the tractor-trailer of FIG. 1.

FIGS. 6A and 6B show the application of my invention to tank containers for transportation of fluids.

DESCRIPTION OF A PREFERRED EMBODIMENT

Figure 5:
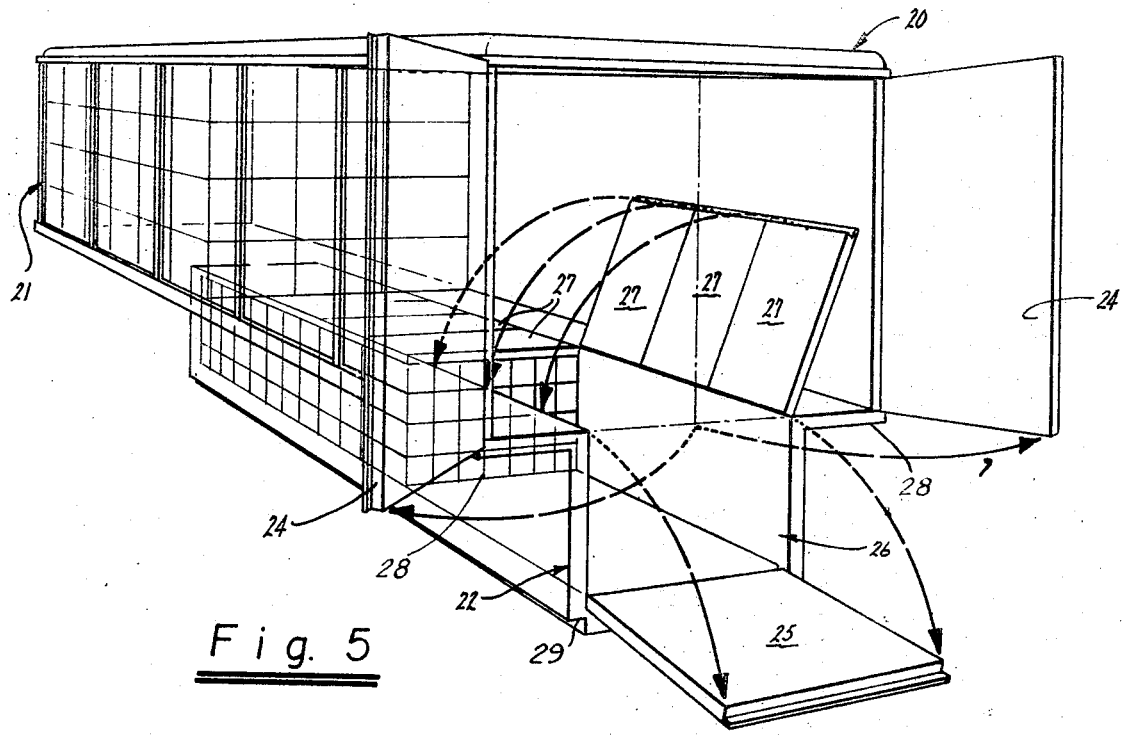
FIG. 5 is a phantom isometric view of a container showing the advantageous loading features.

Referring now to the figures, and particularly at present to FIG. 1 and FIG. 2, there is seen the conventional trailer body 1 with connecting links and pins 2. The body 1 has an underslung frame 3 and rear wheels 4 mounted on a body frame and hydraulic cylinders 5. In the embodiment shown the plungers 9 of these cylinders are equipped with a conical engaging member 6 for engaging the lower surfaces of the container as will be described more fully below. Toe member 7 is of L-shaped configuration and engages plunger 9 at its upper end and engages the horizontal shoes 8 at its lower end which in turn engage the lower edges of the container as will also be described below. The truck or tractor section 10 is of the conventional type except that it contains the mechanism for supplying fluid pressure to the hydraulic cylinders 5. This is not shown in the drawings. The body frame 3 is substantially U-shaped with spaced longitudinal frame members 11 open at the rear end of the trailer frame 3.

Referring now more particularly to FIG. 3 and FIG. 5, there are seen two views of a typical container of my invention. The container body itself 20 comprises an upper section 21 and a lower section 22 having a narrower width, but capable of receiving cargo. The sockets 23, which are of conical configuration, are adapted for receiving the ends 6 of plunger 9. The body of the container is further equipped with vertically hinged loading doors 24 and a horizontally hinged loading door 25. When the latter is in an open position as shown, it provides a ramp upon which a loading truck such as a fork lift truck may gain access to the interior of the container. The latter is made further accessible by use of the hinged floor 27 which comprises essentially a series of trap doors separating the upper portion 21 from the lower portion 22 of the container.

The upper container section 21 is wider than the space between the longitudinal frame members 11. The lower container section 22 is narrower than the space between said frame members 11 so as to form longitudinal shoulders 28. The sockets 23 are in the shoulders 28. The lower container section 22 has longitudinal ledges 29 near its bottom for engagement by the shoes 8.

OPERATION

The operation employing my invention may be summed up briefly as follows:

The container 20 may first be assumed to be located at a warehouse or other place from which it is sought to transport cargo. This container, of course, may be left at this location for a prolonged period of time and requires no great maintenance or first cost and, of course, no license or insurance as a vehicle. The cargo, depending upon its nature, is loaded into the interior in a manner described above or in any other convenient manner and the doors secured. When it is time for the shipment to be made, the truck and trailer arrives and the trailer is backed in under the container. The longitudinal frame members 11 are arranged so that they straddle the lower section 22 of the container and the trailer is maneuvered in position so that the engaging member 6 of the hydraulic cylinders 5 are in position to engage the recesses or sockets 23 under the shoulders 28. Fluid pressure is then supplied to the hydraulic cylinders 5, raising the plungers 9 and engaging the recesses or sockets 23. At the same time, and this is a very important feature, the shoes 8 engage the lower ledges 29 of the bottom section 22. The combined action of the engaging members 6 and the shoes 8 is such that it raises the container upwards and at the same time maintains its lateral stability. This is continued until the proper elevation is attained, whereupon the container is held in this position by the aforesaid combined action and is ready for transportation. When the destination is reached the above process is reversed and the container left for unloading at the convenience of the receiver. It is thus evident that this transportation may be effected with a minimum exercise of manpower and without the need of any equipment or devices other than those provided by my invention which form a part of the trailer.

I have discovered also that my invention may be used advantageously for different types of cargo. Thus referring now more particularly to FIGS. 6, 6A and 6B there is shown a fluid container 30 supported on block supports 31. In this case the T configuration is supplied by lifting wings 32 in which are located the lifting sockets or recesses 23 for receiving the engaging members 6 as described above. Otherwise the operation is exactly like that in the case of the solid cargo container described above.

Figure 7:
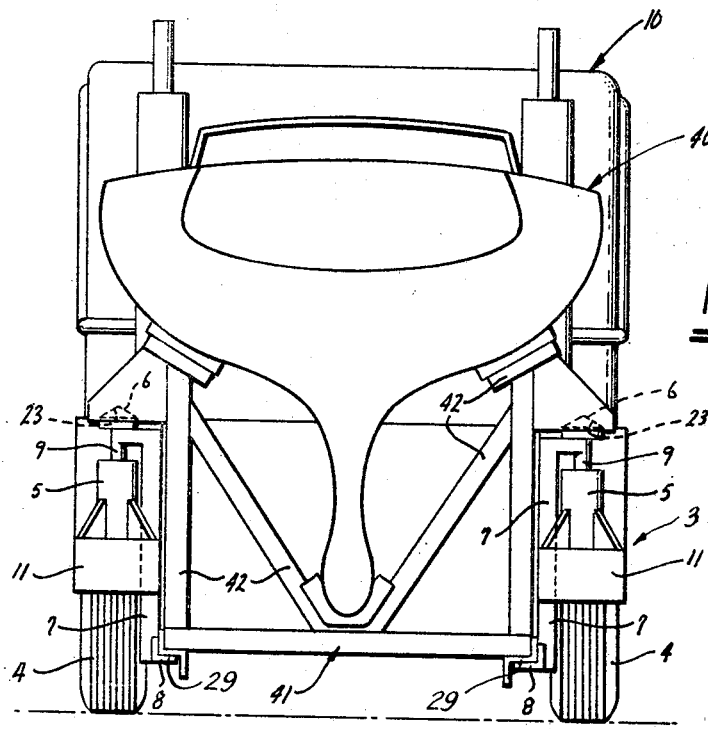
FIG. 7 shows the application of my invention to the transportation of boats and similar objects.

For transportation of boats or similar objects I may use the embodiment shown on FIG. 7. Here there is seen a cross-section of a boat 40 held in a cradle or platform supports 41 and 42. In this embodiment I may or may not use lifting wings depending on the stability of the object, but I do employ my toe members 7 and shoes 8 in a manner similar to that described for my cargo container above.

What is claimed is:
1. A trailer and container comprising:
   a body frame,
   a plurality of hydraulic cylinders fixedly positioned vertically along opposite parallel sides of said frame,
   said cylinders being equipped with vertical hydraulic plungers,
   said plungers being disposed to engage horizontal surfaces of a cargo container,
   toe members fixedly positioned on each of said plungers and extending vertically downward therefrom,
   horizontal shoe members positioned along opposite parallel sides of said frame,
   each of said toe members being fixedly positioned to the said shoe members on the corresponding side of said frame,
   said shoe members being disposed to engage opposite sides of said cargo container while said plungers engage said horizontal surfaces,
   means for supplying fluid pressure to said hydraulic cylinders.
2. The combination of claim 1 in which
   said body frame comprises two parallel longitudinal sections in spaced relation to each other,
   said hydraulic cylinders are positioned upon said longitudinal sections,
   and said shoe members are positioned below said longitudinal sections.
3. In a combination comprising a trailer and a portable container, said trailer being characterized by a substantially U-shaped body frame comprising two parallel longitudinal sections in spaced relation to each other, said container having horizontal surfaces above said longitudinal sections and having a portion below said surfaces extending between said sections, and having lower horizontal edges spaced from the bottom of said portion, the improved device for positioning said container upon said trailer and for transportation thereby comprising:
   a plurality of hydraulic cylinders fixedly positioned vertically on said longitudinal sections,
   said cylinders being equipped with vertical hydraulic plungers,
   toe members comprising a vertical section fixedly positioned on each of said plungers,
   horizontal shoe members positioned parallel to said longitudinal sections and engaging said toe members,
   said shoe members being disposed to engage said lower horizontal edges of said container,
   means for supplying fluid pressure to said hydraulic cylinders.
4. The device of claim 3 including means positioned on the top end of said vertical plungers for engaging said horizontal surfaces of said container while said shoe members are simultaneously engaging said lower horizontal edges of said container.

References Cited

UNITED STATES PATENTS

| | | | |
|---|---|---|---|
| 3,255,906 | 6/1966 | Proler et al. | 214—390 |
| 3,314,655 | 4/1967 | Steele | 214—515 |
| 3,315,829 | 4/1967 | Cellini | 214—392 |

ALBERT J. MAKAY, Primary Examiner

U.S. Cl. X.R.

214—515; 254—45; 280—43.23, 414